No. 626,899. Patented June 13, 1899.
C. W. GASKILL.
DEVICE FOR MOISTENING AND SEALING ENVELOPS.
(Application filed May 27, 1898.)
(No Model.)
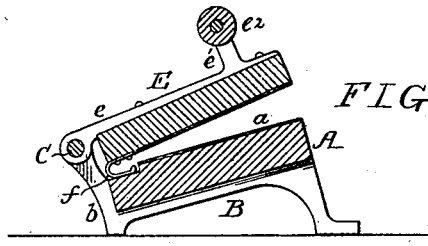
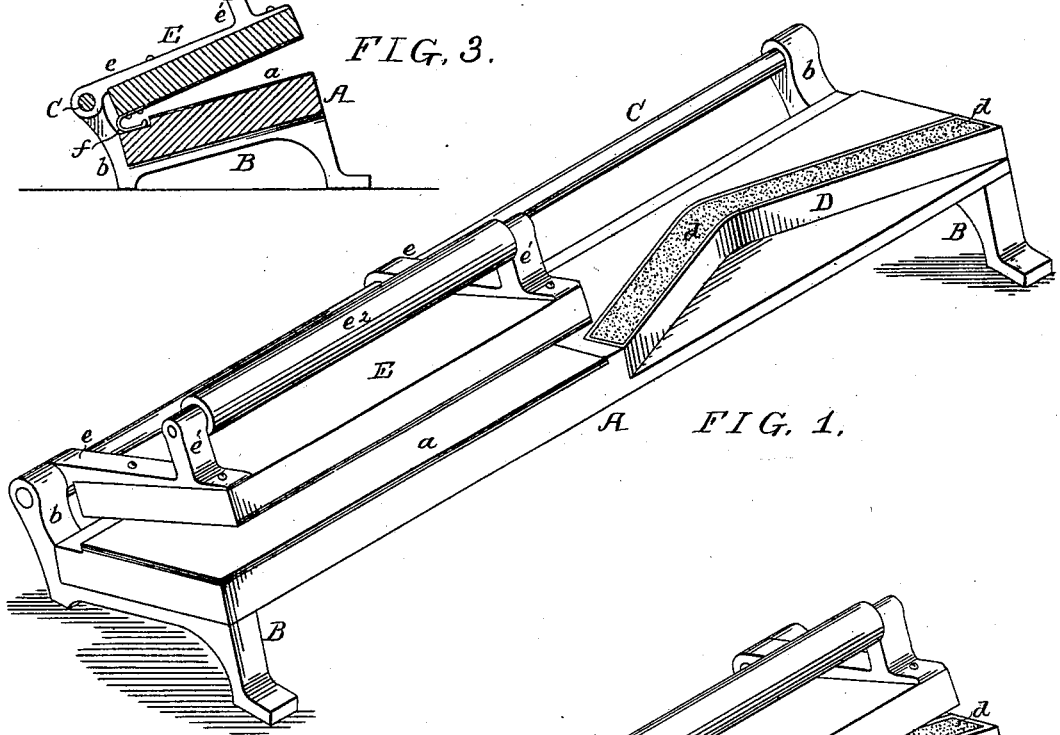
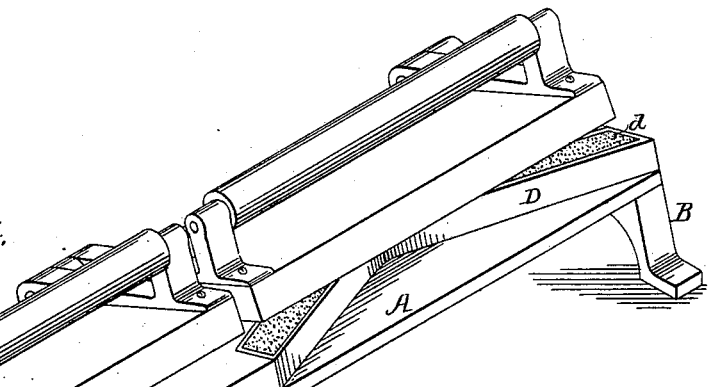
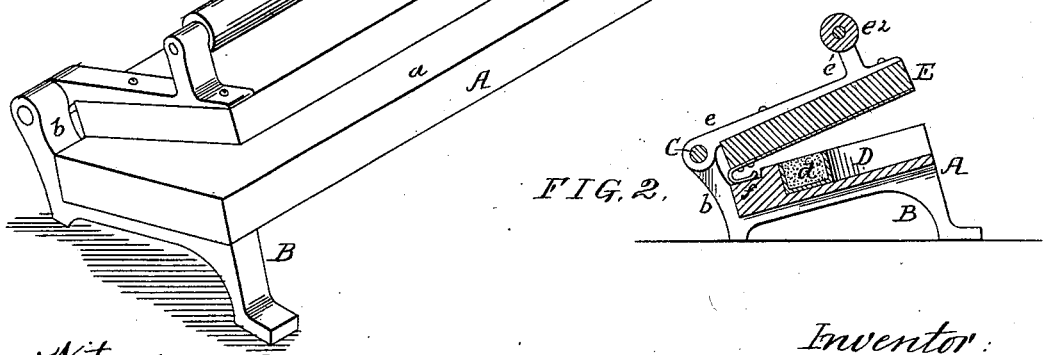
Witnesses:
Charles DeBow
Frank L. A. Graham
Inventor:
Charles W. Gaskill
by his Attorneys
Howson & Howson

UNITED STATES PATENT OFFICE.

CHARLES W. GASKILL, OF PHILADELPHIA, PENNSYLVANIA.

DEVICE FOR MOISTENING AND SEALING ENVELOPS.

SPECIFICATION forming part of Letters Patent No. 626,899, dated June 13, 1899.

Application filed May 27, 1898. Serial No. 681,931. (No model.)

*To all whom it may concern:*

Be it known that I, CHARLES W. GASKILL, a citizen of the United States, residing in Philadelphia, Pennsylvania, have invented certain Improvements in Devices for Moistening and Sealing Envelops, of which the following is a specification.

The object of my invention is to construct a device for the rapid moistening of envelops and for the sealing of the same. This object I attain in the following manner, reference being had to the accompanying drawings, in which—

Figure 1 is a perspective view of my improved envelop-moistening device. Fig. 2 is a section on the line 2 2, Fig. 1, with the pressure-pad above the moistener. Fig. 3 is a section on the line 3 3, Fig. 1; and Fig. 4 is a view of the device provided with two pressing-pads.

A is the base of the device, mounted on stands B B at each end. The base A is of sufficient width to accommodate an ordinary-sized envelop in either of two positions; but it will be understood that the size of the device may be increased or diminished, as desired. Projecting from the rear of each stand B are arms $b$ $b$, in which a slide-rod C is mounted.

D is a pan or receptacle shaped to correspond to the flap of an envelop, and in this receptacle is packed suitable absorbing material $d$, either absorbent cotton or sponge. This material may be covered or not, as desired. The pan is preferably so shaped and of a width to moisten the gummed portion only of an envelop.

$a$ is the sealing-section of the device, and preferably has a platen of flexible material, such as blotting-paper or fabric.

E is the presser-pad, made to take in the full width of the section $a$ of the device when shifted to one position or the full length of the pan D when shifted to the other position. The presser-pad E has rearwardly-extending arms $e$ $e$, which are adapted to travel on the slide-rod C, and these arms have portions $e'$, forming bearings for the handle $e^2$. It will be understood, however, that this handle may be formed in any manner without departing from the invention. The under side of the presser-pad is preferably surfaced with a yielding material, such as blotting-paper. To the rear of the presser-pad is secured one or more springs $f$, which are adapted to rest upon the base A and tend to hold the presser-pad in the elevated position.

In some instances the presser-pad may be arranged in a stationary position above the section $a$ of the base and the envelop pressed onto the moistening material $d$ by hand, and then when the flap is folded onto the body of the envelop it can be sealed between the presser-pad and the section $a$ of the base and slide; but it can be used when it is not wished to soil the fingers in any way to slide the presser-pad to a position above the moistening device and above the envelop, either moistening the body of the envelop or the flap by forcing the presser-pad down. Then by moving the presser-pad on the slide-rod to a position above the portion $a$ of the base and turning the flap down onto the body of the envelop and passing it between the presser-pad and the base and again forcing the presser-pad down the envelop will be sealed.

In Fig. 4 I have shown a modification in which two presser-pads are used, one mounted above the moistening device and the other mounted above the flat section of the base.

I claim as my invention—

1. The combination in an envelop-moistening device, of an oblong base, a moistening medium located in one end of said base, and a flat portion at the other end of the same, with means carried by the oblong base at the rear of the same adapted to press the flap of the envelop onto the moistener and to seal the envelop when placed on the flat portion of the base, substantially as described.

2. The combination of the base having two sections, one being flat and used for sealing an envelop, the other having a pan shaped to correspond with the adhesive surface of an envelop, a presser-pad, a slide-rod on which the presser-pad is mounted, so that the presser-pad can be moved to either of two positions, to moisten and seal an envelop, substantially as described.

3. The combination of the base, stands at each end of the base, arms projecting up from the rear of the stands, a slide-rod mounted on said arms, a presser-pad having arms adapted to slide on the rod, a spring for elevating the presser-pad, said base having a moistening-section and a sealing-section, substantially as described.

4. The combination of the oblong base having an upper surface inclined from front to rear, a moistening-pan shaped to conform to the adhesive portion of an envelop-flap at one end of said base, a plane surface upon which the envelop may be sealed at the other end of the same, with a presser-pad arranged above the oblong base and in line therewith, said pad being hinged to the oblong base at the rear of the same, substantially as and for the purpose set forth.

In testimony whereof I have signed my name to this specification in the presence of two subscribing witnesses.

CHARLES W. GASKILL.

Witnesses:
   WILL. A. BARR,
   JOS. H. KLEIN.